(No Model.)
M. D. BEARDSLEE.
GRAIN SCOURER.
No. 315,997. Patented Apr. 21, 1885.
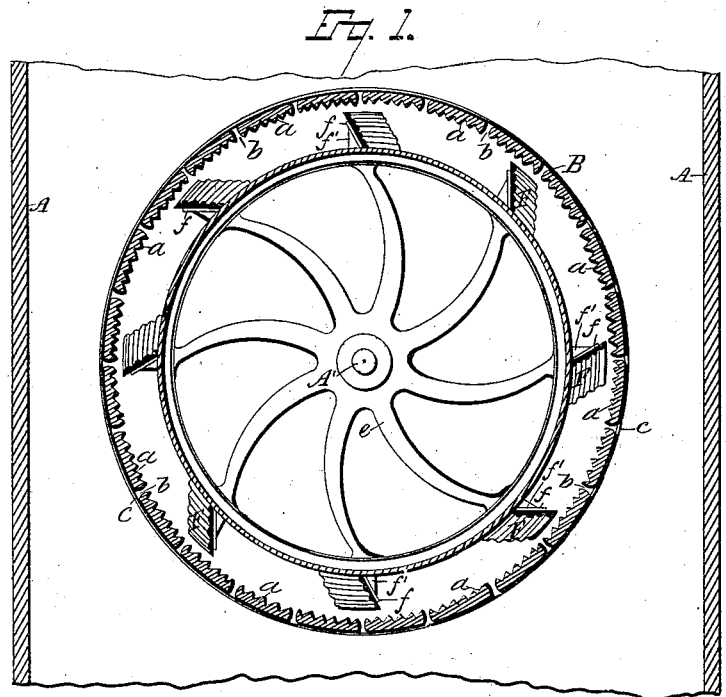
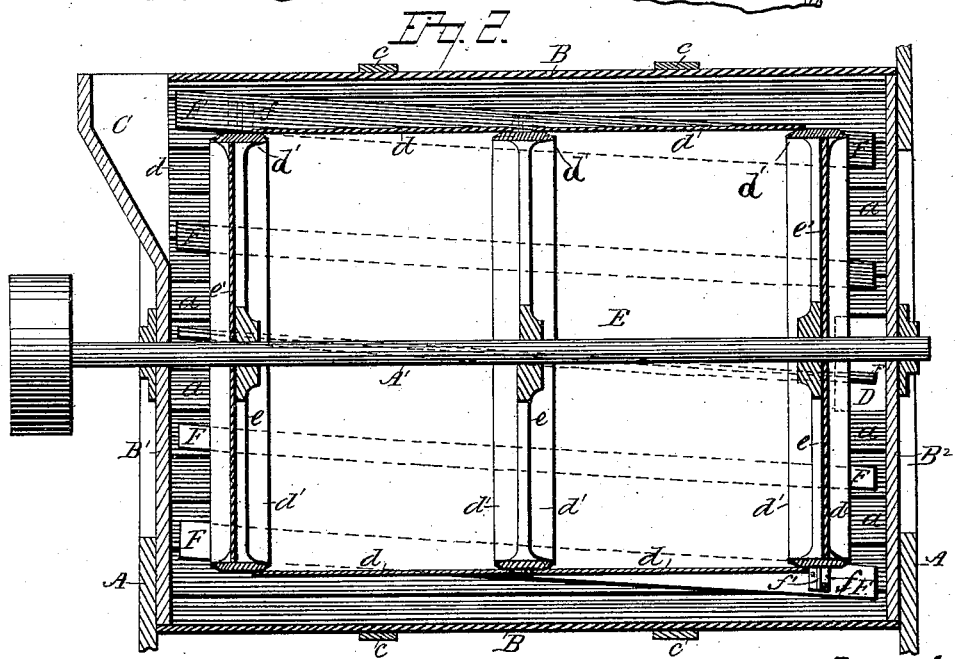
Witnesses:
Inventor:
Marcus D. Beardslee
By
Stout & Underwood
Attorneys.

UNITED STATES PATENT OFFICE.

MARCUS D. BEARDSLEE, OF MILWAUKEE, WISCONSIN.

GRAIN-SCOURER.

SPECIFICATION forming part of Letters Patent No. 315,997, dated April 21, 1885.

Application filed January 23, 1884. (No model.)

*To all whom it may concern:*

Be it known that I, MARCUS D. BEARDSLEE, of Milwaukee, in the county of Milwaukee, and in the State of Wisconsin, have invented certain new and useful Improvements in Grain-Scourers; and I do hereby declare that the following is a full, clear, and exact description thereof.

My invention relates to improvements in grain-scourers, and will be fully described and claimed hereinafter.

In the drawings, Figure 1 shows a vertical cross-section through center of my improved machine, and Fig. 2 is a vertical longitudinal section of the same.

A A indicate the casing, and B is the stationary drum of the scourer. This drum B is made of a series of staves, $a\ a\ a$, corrugated on their inner faces and slightly spaced one from the other, as shown at $b$, for the passage of the dust and dirt down between them and into the bottom of the casing. The ends of the staves $a$ are fastened to and around the heads $B'$ and $B^2$, suitably supported inside of the casing, and the hoops $c$ encircle the staves at certain points to strengthen and keep them in place. The head $B'$ on the front of the machine has an opening at $d$, opposite which opening is the hopper C, suitably fastened to the casing A. Close to the opposite head, $B^2$, and on the side of the drum selected for the outlet of the grain, an opening is made in the staves $a$ in about the center of the drum, as shown at D.

Inside the stationary drum B, and running on the driving-shaft $A'$, is the revolving drum E, which consists of the spider-disks $e\ e\ e$, suitably fastened to the driving-shaft, and the sheet-metal sections $d\ d$. The spider-disks $e\ e\ e$ have on each of their outer rims a flange, $d'$, the upper face of which is slightly beveled. Around these beveled flanges the ends of the sheet-metal sections $d$ are forced up in place against the studs $f\ f\ f$, formed on the centers of the spider-rims. These studs are given a certain incline backward, and have strengthening-flanges $f'$, which carry on their front faces the beaters F F, which are fastened thereon in any suitable manner, so as to lie at a slight angle to the vertical plane of the drum and form spirals around its periphery, thus giving to the drum means to convey the grain from its receiving-point—the hopper C—to its outlet D. On the front faces of the beaters F F are formed ogee corrugations, by means of which, and of the corrugations made on the inner faces of the staves $a\ a$, the grain is thoroughly cleaned as it is propelled along and around the drum to its outlet D. The revolving drum E is closed at both of its ends by the sheet-metal heads $e'\ e'$, fastened on the outer faces of the end spider-disks, $e\ e$. The beaters F F, however, project beyond these heads $e'\ e'$ and reach close to the inner faces of the heads $B'$ and $B^2$ of the stationary drum, while the longitudinal edges of said beaters run close to the inside faces of the staves $a\ a$ of said drum, so that the grain may be acted upon by the beaters from the time it enters the stationary drum until it is at last driven out through the opening D.

From the above description the advantages to be derived by the peculiar construction of the revolving drum of my grain-scourer are obvious. While the mounting of the drum-sections over and around the beveled flanges of the spiders affords a simple, convenient, and cheap way of securing them in place, so as to form a light and air-tight cylinder, the operation of replacing the sections when worn out is thereby also greatly simplified. The same advantage of solidity and of convenience of renewal is also secured by the attachment of the beaters to the studs projecting out of the spider-rings.

Having thus described my invention, what I claim as new, and desire to secure by Letters Patent, is—

1. In a revolving drum for grain-scourers, spider-disks having beveled flanges projecting horizontally on each side, and supporting-studs that project radially therefrom and between the flanges, in combination with metallic cylinder-sections fitting around the beveled flanges of the disks, and spiral-shaped beaters fastened onto the supporting-studs, substantially as set forth.

2. In a grain-scourer, a revolving drum composed of spider-disks provided with beveled flanges projecting horizontally on each side of their rims, and supporting-studs projecting radially outward therefrom, metallic cylinder-sections fitting around the beveled flanges of the disks, and spiral beaters fastened onto the supporting-studs, in combination with the driving-shaft, and a stationary drum made of corrugated spaced staves, substantially as set forth.

3. In a grain-scourer, the combination of the spider-disks $e$, having studs $f$, the sheet-metal sections $d$, and beaters F, having corrugated faces attached to studs $f$ and arranged spirally upon the face of the said metal sections, substantially as described and shown, and for the purpose set forth.

4. In a grain-scourer, the combination of an inner revolving drum consisting of the spider-disks $e$, having studs $f$, the sheet-metal sections $d$, heads $e'$, and beaters F, having corrugated faces attached to studs $f$, and arranged spirally upon the face of the said metal sections, with an outer stationary cylinder consisting of a series of staves, $a$, having corrugated inner faces, connecting-hoops C, and end plates, B' and $B^2$, substantially as shown and described.

In testimony that I claim the foregoing I have hereunto set my hand, at Milwaukee, in the county of Milwaukee and State of Wisconsin, in the presence of two witnesses.

MARCUS D. BEARDSLEE.

Witnesses:
S. S. STOUT,
H. G. UNDERWOOD.